United States Patent [19]

Suzuki

[11] 3,912,784

[45] *Oct. 14, 1975

[54] PRODUCTION OF PHENOL BY DECARBOXYLATIVE HYDROLYSIS OF A CHLOROBENZOATE SALT

[75] Inventor: Shigeto Suzuki, San Francisco, Calif.

[73] Assignee: Chevron Research Company, San Francisco, Calif.

[ * ] Notice: The portion of the term of this patent subsequent to Sept. 18, 1990, has been disclaimed.

[22] Filed: June 30, 1969

[21] Appl. No.: 837,385

[52] U.S. Cl. ..... 260/621 R; 260/524 R; 260/621 P; 260/629; 260/650 R
[51] Int. Cl.² ................... C07C 37/00; C07C 37/02
[58] Field of Search........ 260/621 R, 621 G, 621 H, 260/621 P, 524 R, 515 A, 629, 650 R

[56] References Cited
UNITED STATES PATENTS

| | | | |
|---|---|---|---|
| 2,488,472 | 11/1949 | Kremers | 260/621 R X |
| 3,177,256 | 4/1965 | Holtzclaw | 260/621 G X |
| 3,234,291 | 2/1966 | Kelly | 260/621 R X |

OTHER PUBLICATIONS

Noller, "Chemistry of Organic Compounds," 3rd Edition, pp. 492–493 (1965).

Ibid., p. 557.

Ibid., p. 558.

Ibid., p. 563.

*Primary Examiner*—Norman P. Morgenstern
*Attorney, Agent, or Firm*—G. F. Magdeburger; John Stoner, Jr.; T. G. De Jonghe

[57] ABSTRACT

Phenol is produced from toluene in an integrated process involving monochlorination, alkyl side chain oxidation and a decarboxylative hydrolysis in the liquid phase of an alkali metal chlorobenzoate salt in the liquid phase at an elevated temperature.

3 Claims, 1 Drawing Figure

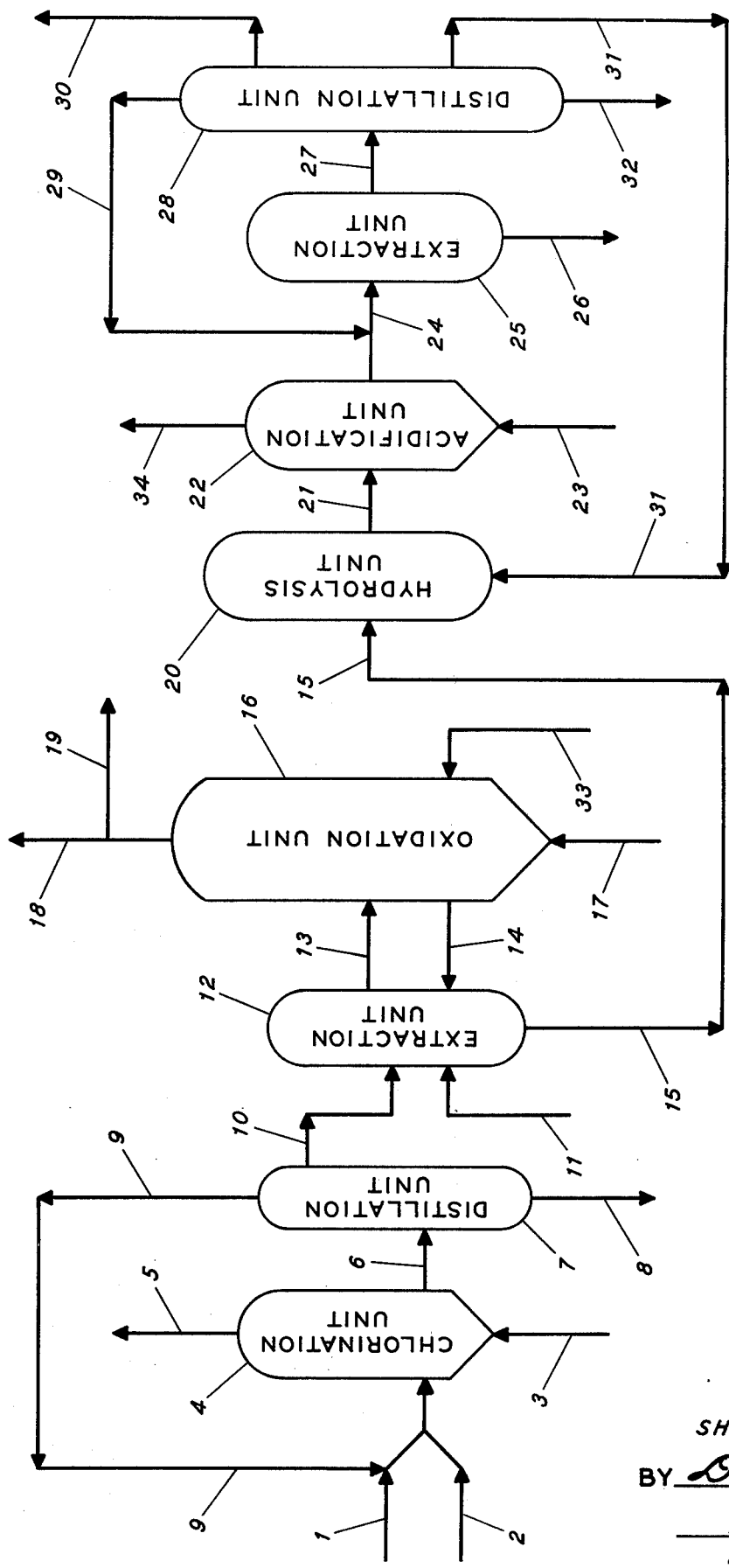

PRODUCTION OF PHENOL BY DECARBOXYLATIVE HYDROLYSIS OF A CHLOROBENZOATE SALT

FIELD OF INVENTION

This invention relates to a novel process for the production of phenol, particularly to an integrated process for the production of phenol from toluene.

BACKGROUND OF INVENTION

It is known to produce phenol in a process in which benzoic acid is subjected to an oxidative decarboxylation at an elevated temperature (see, for example, U.S. Pat. No. 3,762,838). Benzoic acid is ordinarily obtained by the liquid phase air oxidation of toluene. In the decarboxylation reaction the phenol moiety is not directly available from the oxidation product because the primary product is phenyl benzoate ester. Consequently, an additional process stage, a hydrolysis unit, is required to liberate the phenol. A further problem in this prior art is the fact that the conversion of the benzoic acid per oxidation cycle can at best be only 50%.

INVENTION DESCRIPTION

It has now been found that phenol can be efficiently produced from toluene in an integrated process in which:

a. Toluene is monochlorinated under benzene ring chlorination conditions to yield monochlorotoluene and hydrogen chloride gas;

b. The monochlorotoluene is oxidized to monochlorobenzoic acid under alkyl benzene side chain liquid phase oxidation conditions;

c. The chlorobenzoic acid together with water and a strong inorganic base is charged to a reactor to yield a reaction system wherein for each mol of the chlorobenzoate salt there is present from about 3 to 5 equivalents of the base, and from about 5 to 250 mols of water, and the following system conditions are maintained:

1. a temperature in the range from about 150° to 300°C., preferably 200° to 275°C.; and
2. a pressure sufficient to maintain an aqueous reaction phase for a reaction period in the range from about 0.1 to 10 hours, thereafter cooling the resulting reaction mixture to a temperature in the range from about 0° to 125°C. and liberating the phenol by acidifying the mixture, preferably with the hydrogen chloride produced in the chlorination stage plus sufficient additional acid as required to displace phenol from its salt.

The phenol may be recovered from the aqueous reaction mixture by extraction with a suitable water immiscible organic solvent, for example toluene, benzene, or the like.

The conversions and yields in each stage of the present integrated process are excellent. Thus, the process provides an efficient and convenient means for the conversion of toluene to phenol, one which does not require hydrolysis of a phenyl ester and which is free of the problems encountered in the well-known process for the production of phenol from cumene hydroperoxide. In the latter process a plethora of byproduct components in trace amounts complicates the purification of the phenol.

The monochlorination of toluene is well known in the art. The conditions, briefly, include a catalyst to promote ring rather than side chain chlorination, e.g., ferric chloride, a reaction temperature in the range from about 0° to 100°C., the introduction of a chlorine gas stream into the toluene, and the use of the partial conversion [usually less than a 50-80% conversion] technique in order to avoid polychlorination of the toluene.

The conditions for the oxidation of benzene side chains and particularly methyl groups in the liquid phase oxidation of alkyl-substituted aromatic compounds are known in the art and include the use of air or an oxygen-containing gas, a reaction temperature in the range from about 110° to 160°C., the use of a liquid phase oxidation catalyst such as cobalt, manganese, and the like in the form of salts such as the acetate, 2-ethylhexanoate, bromide, benzoate, ect., and the use of a means to separate water in a reflux-type arrangement from the oxidate mixture, e.g., a water separator.

In the unique decarboxylative hydrolysis reaction of the instant process the monochlorobenzoic acid is converted to an alkali or alkaline earth metal salt or ammonium salt, preferably the sodium salt, and the salt plus additional strong inorganic base (base strength must be at least of the order of that of ammonium hydroxide) are charged to a pressurizable reaction zone. i.e., an autoclave or the equivalent. In order to avoid difficulties normally encountered in caustic fusion reactions enough water should be present during the hydrolysis to provide a fluid reaction system; for example, at least about 5 mols of water per mol of the monochlorobenzoate salt feed. On the other hand, the use of a relatively large amount of water, i.e., 250 mols of water per mol of benzoate salt and higher, is unsatisfactory because there is no particular advantage from the presence in the reaction zone of more than about 50 mols of water per mol of the salt. The preferred feed range is 5 to 50 mols of water per mol of the chlorobenzoate salt. Surprisingly, an aqueous solution of a strong inorganic base is an effective means for the hydrolysis of chloride attached to a benzene ring provided that a carboxyl group is also attached to the benzene ring. Ordinarily in the displacement of chloride from a benzene ring, for example from chlorobenzene, caustic fusion conditions are employed and the presence of water is undesirable. It appears, therefore, that the carboxyl group of the monochlorobenzoate ion promotes or facilitates replacement of the chloride group by a hydroxide group.

The phenol generating chloride replacement reaction may be summarized by the chemical equation:

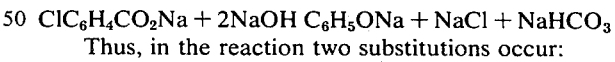
$ClC_6H_4CO_2Na + 2NaOH \rightarrow C_6H_5ONa + NaCl + NaHCO_3$

Thus, in the reaction two substitutions occur:

1. a carboxyl group is replaced by hydrogen, and
2. a chloride group is replaced by a hydroxyl group.

The total base required for the process, including that for the neutralization of the carboxylic acid group, is three equivalents per mol of chlorotoluene feed. Mineral base in excess of the stoichiometric requirement may be added to the reaction mixture; however, since the excess must be neutralized for recovery of the phenol, to do so would be relatively inefficient.

The FIGURE illustrates a preferred embodiment of the invention in which toluene is converted to phenol in an integrated process. The quantities noted below are in parts by weight per hour.

Into chlorination unit 4 are charged 920 parts of toluene and 18.5 parts of ferric chloride via lines 1 and 2. The average residence time for the charge in unit 4 is 2.5 hours. Via line 3, 745 parts of chlorine are also charged to unit 4 while maintaining the temperature of the chlorination reaction mixture at 5 ±5°C. The reaction product is hydrogen chloride, 383 parts, and a mixture of toluene and chlorinated toluene, 1450.5 parts. The former is vented from unit unit 4 via line 5 for delivery to neutralization unit 27, the latter is withdrawn via line 6 and delivered to distillation unit 7 where the mixture is distilled:

1. into an overhead fraction having a boiling point below 155°C., 150 parts of tolluene, which is withdrawn via line 9 and recycled to the process;
2. into a side cut fraction having a boiling point between 155° and 165°C., 120.15 parts of monochlorotoluene which is withdrawn via line 10; and
3. a bottoms fraction having a boiling point above 165°C., 99 parts of a mixture of polychlorotoluene, catalyst residues and tar, which is discharged from the process via line 8. The withdrawn monochlorotoluene is delivered to extraction unit 12 via line 10.

Extraction unit 12 is a liquid-liquid extractor, and associated settlor and liquid phase separator. In addition to the above-noted monochlorotoluene, via line 14, oxidate containing in the main chlorobenzoic acid, partial oxidation products and monochlorotoluene, 5074 parts, and via line 11, 30 per cent aqueous sodium hydroxide, 6150 parts, are charged to extraction unit 12, the aqueous and hydrocarbon phases are thoroughly and efficiently mixed in extraction unit 12 and separated into an organic phase and an aqueous phase. The organic phase, 4806 parts, is withdrawn and passed via line 13 to oxidizer 16 and the aqueous phase, 7590 parts containing the sodium salt of monochlorobenzoic acid is withdrawn and passed via line 15 to hydrolysis unit 20.

Oxidation unit 16 is a liquid phase reactor fitted for basal introduction of air, 4350 parts via line 17. The charge to unit 16 is a chlorobenzoic acid stripped mixture of partial oxidate and monochlorotoluene, 4806 parts, and cobalt-2-ethylhexanoate catalyst, 1.5 parts which is introduced to the unit via lines 13 and 33. The average residence time and temperature in the oxidizer is 6 hours and 145°C. The oxygen depleted air (3435 parts nitrogen, 436 parts oxygen and 4 parts carbon dioxide) is exhausted from the oxidizer via line 18 together with water, 169.5 parts, and chlorobenzene.

For the phenol recovery stage, via line 15 the 7590 parts of the aqueous alkaline solution of the sodium salt of monochlorobenzoic acid withdrawn from extraction unit 12 is charged to hydrolysis unit 20 together with recycle chlorobenzoic acid, 203.5 parts, which is introduced to the unit via line 31. The temperature and average feed residence time in the hydrolysis is 250°C. and 2 hours. The pressure must be sufficient to maintain the aqueous liquid phase. The product, 7822 parts, is withdrawn from unit 20 via line 21 and passed to acidification unit 22 into which hydrogen chloride, 1345 parts, is also introduced via line 23 liberating carbon dioxide, 400 parts, which is vented via line 23 liberating carbon dioxide, 400 parts, which is vented via line 34 and producing an aqueous solution saturated with sodium chloride, an organic phase comprising phenol, chlorobenzoic acid, and sodium chloride crystals. This mixture, 8769 parts, is withdrawn from unit 20 via line 24 and charged to extractor 25 together with 5000 parts of benzene where after thorough extractive mixing of the liquid phase, they are separated with the aqueous phase, 8665 parts, being discharged via line 26 and the organic phase 6105 parts being passed to distillation to unit 28 where it is fractionated into a benzene fraction which is recycled to the process via line 29, a phenol fraction, 855 parts, which is passed to product storage via line 30; a chlorobenzoic acid fraction, 203.5 parts, which is recycled to hydrolysis unit 20 via line 31 and a bottoms fraction, 46 parts, which is discharged from the process via line 32. The yield of phenol based upon toluene, is about 91 mol percent.

EXAMPLE 1

Into a pressure autoclave was charged the following reaction mixture:

| | |
|---|---|
| p-Chlorobenzoic acid, mols | 0.2 |
| Sodium hydroxide, mols | 1.0 |
| Water, mols | 5 |

The autoclave was sealed and heated with mixing at a temperature of about 250°C. and a pressure of about 440 psig, i.e., sufficient to maintain the liquid reaction medium. After about two hours at temperature the autoclave and contents were cooled and the reaction mixture was acidified. The feed conversion was found to be 85 percent and the yield of phenol exceeded 95 mol percent.

EXAMPLE 2

The invention example was repeated except that the p-chlorobenzoic acid feed was replaced by o-chlorobenzoic acid. The conversion was 88% and the yield of phenol again exceeded 95 mol percent.

I claim:

1. Process for the production of phenol from toluene which comprises:
    a. monochlorinating toluene under benzene ring chlorination conditions;
    b. oxidizing the monochlorotoluene to monochlorobenzoic acid under benzene side-chain liquid phase oxidation conditions;
    c. converting the monochlorobenzoic acid to an alkali, alkaline earth metal, or ammonium salt by reacting the monochlorobenzoic acid with an alkali, alkaline earth metal or ammonium base,
    d. charging the monochlorobenzoic acid salt, water and a strong inorganic base to a reaction zone wherein for each mol of the acid salt there is present from about 3 to 5 mols of the base, and from about 5 to 250 mols of water, and maintaining the zone at a temperature in the range from about 150° to 300°C., and at a pressure sufficient to maintain the water in the liquid phase for a reaction period in the range from about 0.1 to 10 hours, said base having a base strength at least of the order of that of ammonium hydroxide; and
    e. thereafter acidifying the resulting hydrolysis mixture and recovering phenol.

2. The process as in claim 1 further characterized in that the temperature is in the range from about 200° to 275°C., in that the mol ratio of water to acid salt is in the range from 5–50 to 1; and in that the base for both steps (c) and (d) is sodium hydroxide.

3. Process for the production of a phenate salt from monochlorobenzoic acid which comprises converting the monochlorobenzoic acid to an alkali, alkaline earth metal, or ammonium salt by reacting the monochlorobenzoic acid with an alkali, alkaline earth metal or ammonium base, and heating a mixture of the acid salt, water and a strong inorganic base at a temperature in the range from about 150° to 300°C. and at a pressure sufficient to maintain the mixture in the liquid phase for a reaction period in the range from about 0.1 to 10 hours, wherein for each mol of the acid salt there is present from about 3 to 5 mols of the base and from about 5 to 250 mols of water, said base having a base strength at least of the order of that of ammonium hydroxide, thereby producing a phenate.

* * * * *